United States Patent

Youn

[11] Patent Number: 5,812,386
[45] Date of Patent: Sep. 22, 1998

[54] POWER SUPPLY CONTROL METHOD AND CORRESPONDING CIRCUIT

[75] Inventor: Hee-Myung Youn, Suwon, Rep. of Korea

[73] Assignee: Samsung Electronics Co., Ltd., Kyungki-Do, Rep. of Korea

[21] Appl. No.: 808,656

[22] Filed: Feb. 28, 1997

[30] Foreign Application Priority Data

Jun. 29, 1996 [KR] Rep. of Korea ............... 26444/1996

[51] Int. Cl.$^6$ ...................................... H02M 5/42
[52] U.S. Cl. ..................... 363/86; 327/544; 363/100
[58] Field of Search .................... 323/349, 351; 364/707; 327/544; 363/85, 86, 100

[56] References Cited

U.S. PATENT DOCUMENTS 5,650,924  7/1997  Huh .......................................... 363/127
5,652,504  7/1997  Bangerter ............................... 323/239

*Primary Examiner*—Peter S. Wong
*Assistant Examiner*—Shawn Riley
*Attorney, Agent, or Firm*—Sughrue, Mion, Zinn, Macpeak & Seas, PLLC

[57] ABSTRACT

A power supply control circuit generates DC power output intermittently at predetermined intervals during a power saving mode of operation, so as to save power. The power supply control circuit includes an AC power circuit for receiving AC power and for outputting the AC power for a predetermined time; a DC power generator connected to the AC power circuit for converting the AC power into DC power; and a controller receiving a power-on/off signal generated from a power switch, for generating a first power control signal of a first logic state in response to the power-on signal and for generating a second power control signal alternating between the first logic state and a second logic state in response to the power-off signal. The second power control signal alternates between the first and second logic states at predetermined intervals.

13 Claims, 3 Drawing Sheets

POWER SUPPLY CONTROL METHOD AND CORRESPONDING CIRCUIT

BACKGROUND OF THE INVENTION

1. Field of the Invention

The present invention relates to a power supply, and more particularly, to a power supply control method and corresponding circuit for minimizing power consumption.

2. Description of the Related Art

Referring to FIG. 1, the prior art power supply includes a power circuit 102 for supplying first and second driving voltages to a controller 104 and to a driving circuit 106, respectively.

The power circuit 102 converts an input AC power into DC power and supplies the DC power output to the controller 104 and the driving circuit 106. In the prior art power supply circuit, the power circuit 102 always supplies power to the driving circuit 106, even when the driving circuit 106 is not operative, thereby unnecessarily wasting power.

SUMMARY OF THE INVENTION

It is therefore an object of the present invention to provide a power supply control circuit for minimizing power consumption and a corresponding method of operation.

It is another object of the present invention to provide a power supply control method and corresponding circuit, in which a driving circuit is not continuously provided with a power when the driving circuit is not being operated, so as to save power.

According to an aspect of the present invention, a power supply control circuit includes an AC power circuit for receiving AC power and for initially outputting the AC power for a predetermined time; an AC-DC converter connected to the AC power circuit for converting the AC power into DC power; and a controller, which receives a power-on/off signal generated from a power switch, for generating a first power control signal having a first logic state in response to a power-on signal, and generating a second power control signal, alternating between the first logic state and a second logic state, in response to a power-off signal. The second power control signal alternates between the first and second logic states at predetermined intervals.

BRIEF DESCRIPTION OF THE DRAWINGS

The above and other objects, features and advantages of the present invention will become more apparent in light of the following detailed description of an exemplary embodiment thereof with reference to the attached drawings in which.

DETAILED DESCRIPTION OF THE PREFERRED EMBODIMENTS

Figure 1:
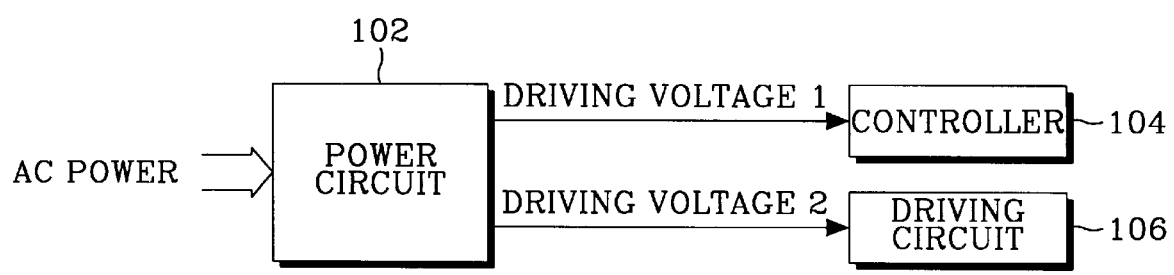
FIG. 1 is a circuit diagram of a power supply circuit according to the prior art.
Figure 2:
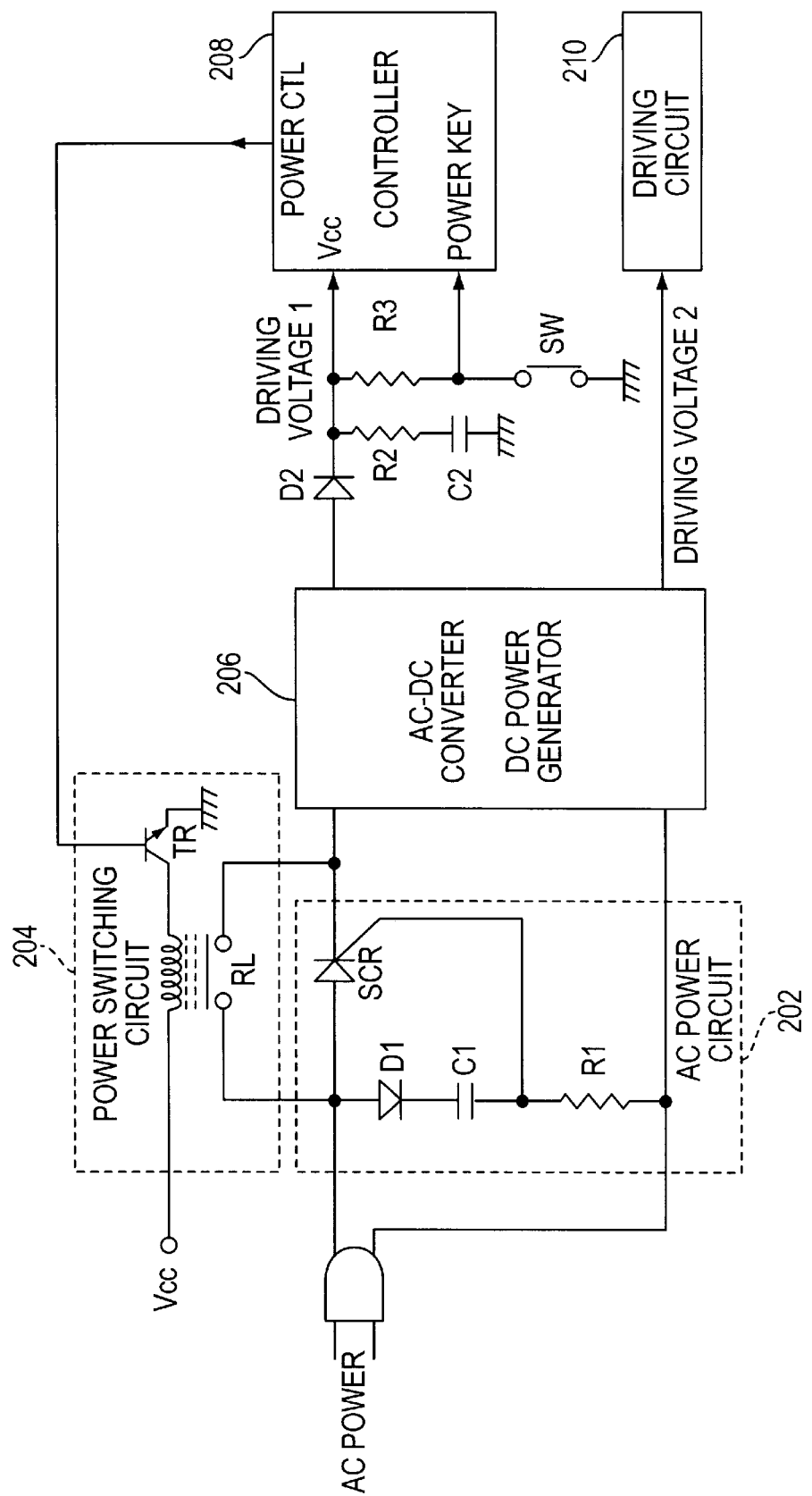
FIG. 2 is a circuit diagram of a power supply control circuit according to an embodiment of the present invention.

Referring to FIG. 2, a power supply control circuit according to an embodiment of the present invention includes a controller 208 for controlling a power switching circuit 204 according to a normal or power saving mode of operation, and for controlling an AC power supplied to an AC-DC 206.

An AC power circuit 202 provides the AC-DC converter 206 with the AC power input according to an on/off state of a thyristor SCR. The AC power circuit 202 includes a diode D1, a capacitor C1 and a resistor R1 connected in series between AC power input lines. The thyristor SCR has a gate connected to a node formed at a junction of the capacitor C1 and the resistor R1. Thus, while the capacitor C1 is being charged, the thyristor SCR is turned on, supplying the AC power input to the AC-DC converter 206. If the capacitor C1 is completely charged, the thyristor SCR is no longer provided with a gating voltage at the gate thereof and thus, is turned off, thereby cutting off the AC power being supplied to the AC-DC converter 206. It is therefore noted from the above description that the AC power circuit 202 provides the AC-DC converter 206 with AC power while the thyristor SCR is initially turned on, and thereafter, cuts off the AC power as the thyristor SCR is turned off due to the complete charge of the capacitor C1.

The power switching circuit 204, including a switching transistor TR and a relay RL, is connected in parallel to the thyristor SCR, and operates in response to a power control signal POWER CTL from the controller 208. For example, if the power control signal is at the logic high state, the switching transistor TR is activated turning on the relay RL. Then, the AC-DC converter 206 is provided with the AC power input via the contacts of the relay RL. The AC-DC converter 206 converts the AC power input into the DC power and outputs first and second driving voltages. The DC power output, corresponding to a first driving voltage, charges a capacitor C2 via a diode D2 and a resistor R2. Alternatively, if the power control signal is at the logic low state, the switching transistor TR is inactivated turning off the relay RL. Then, the AC power being supplied to the AC-DC converter 206 is cut off, because the contacts of the relay RL are disconnected and the thyristor SCR is also turned off. It should, therefore, be understood that the power switching circuit 204 determines whether to supply the AC power to the AC-DC converter 206 in response to the power control signal.

The controller 208 generates the power control signal POWER CTL in response to a power-on/off signal generated by turning on or off a power switch SW, to control operation of the power switching circuit 204. Here, the power-on/off signal is generated according to a turning-on/off state of the power switch SW by the user. The controller 208 generates the power control signal of different logic states according to the normal or power saving mode of operation. The normal mode of operation mentioned in the application means an operational state where the power switch SW is turned on, generating the power-on signal. Alternatively, the power saving mode of operation means an operational state where the power switch SW is turned off, generating the power-off signal.

In the embodiment of the present invention, the controller 208 generates the power control signal of the logic high state during the normal mode of operation. Thus, the power switching circuit 204 provides the AC power input to the AC-DC converter 208 directly through the contacts of the relay RL.

Alternatively, during the power saving mode of operation, the controller 208 generates the power control signal alternating between the logic high and low states with a predetermined period. Thus, the power switching circuit 204 provides the AC-DC converter 206 with the AC power, intermittently. More particularly, if the controller 208 generates the power control signal of the logic high state during the power saving mode, the AC power is supplied to the AC-DC converter 206 directly through the relay RL of the power switching circuit 204. Then, the AC-DC converter 206 converts the AC power input into the DC power output. The DC power output is provided to the controller 208 as the first driving voltage, to the driving circuit as the second driving voltage, and at the same time, is provided to charge the capacitor C2. However, if the controller 208 generates the power control signal of the logic low state during the power saving mode, the AC power being supplied to the AC-DC converter 206 is cut off. Then, the capacitor C2 discharges the charged voltage through the controller 208. Such charging and discharging operations are repeated with the predetermined period. It is preferable that the time period (ratio) of the logic high state to the logic low state during the power saving mode is 1:59.

Figure 3:
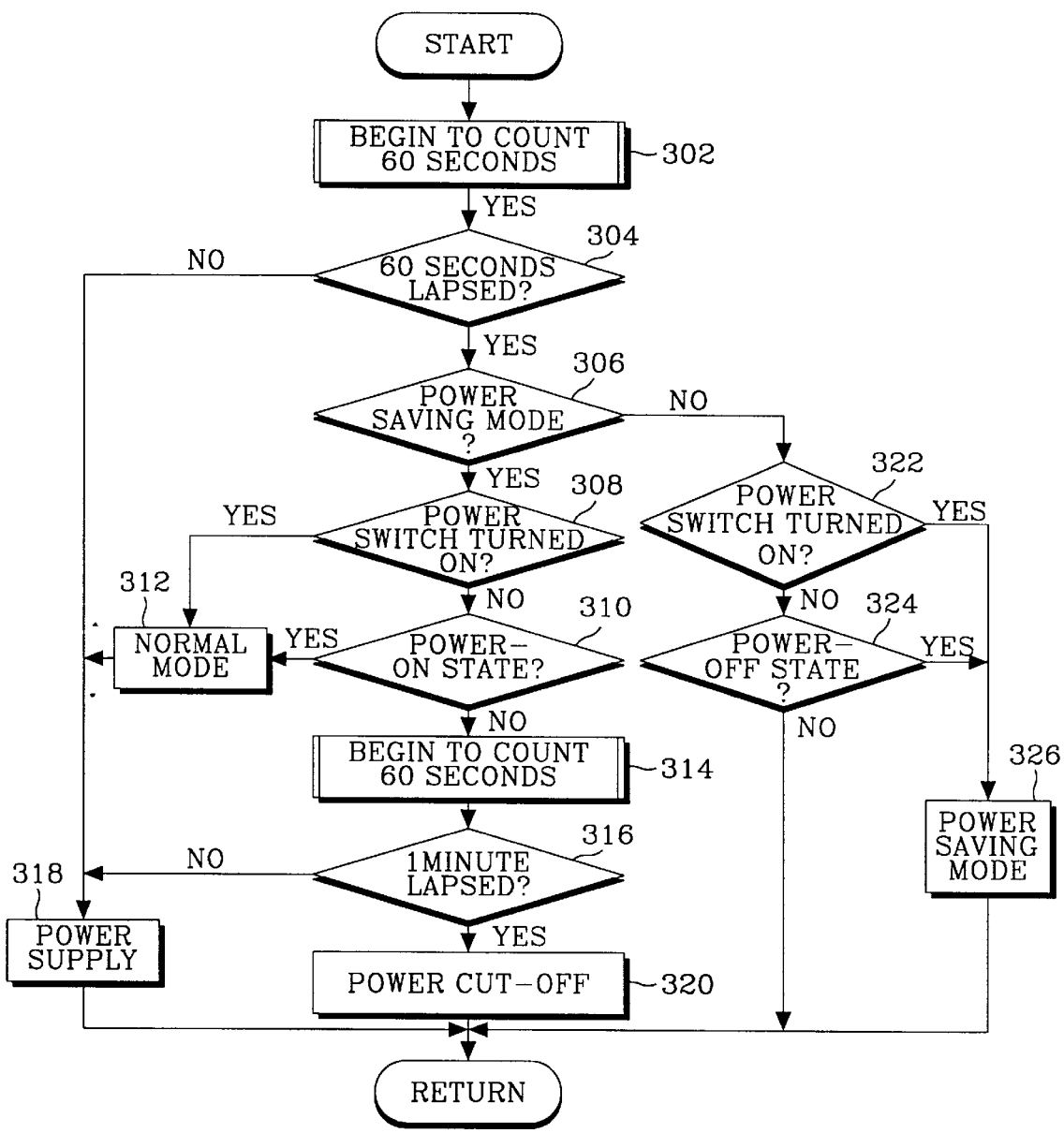
FIG. 3 is a flow chart for controlling the power supply voltage according to an embodiment of the present invention.

Referring to FIG. 3, operation of the power supply control circuit according to the present invention will be described in detail hereinbelow.

When the power supply control circuit is powered up, the controller 208 begins to count, at step 302, a predetermined period of time (for example, 60 seconds in the embodiment) and checks whether or not the predetermined time has lapsed, at step 304. If the predetermined time has not lapsed, the controller 208 generates, at step 318, the power control signal of the logic high state to supply the AC power to the AC-DC converter 206.

However, if the predetermined period of time has lapsed, the controller 208 checks whether the power saving mode is set or not, at step 306. If the power saving mode is set, the controller 208 checks again whether the power switch SW is turned on or not, at step 308. If the power switch SW is not turned on, the controller 208 checks, at step 310, whether or not the system (for example, a VCR) employing the inventive circuit, and requiring operation of the driving circuit 210, is at a power-on state for a particular function such as a reserved recording. However, if the power switch SW has been turned on by the user, the controller 208 is switched over into the normal mode of operation, at a step 312. Further, if the VCR is at the power-on state, the controller 208 is also switched over into the normal mode, at step 312. On the contrary, however, if the VCR is at the power-off state, the controller 208 begins to count a predetermined period of time (for example, one minute), at step 314 and checks whether or not the predetermined one minute has lapsed, at step 316. If the predetermined one minute has not lapsed, the controller 208 generates, at the step 318, the power control signal of the logic high state, to supply the AC power to the AC-DC converter 206. Otherwise, if the predetermined one minute has lapsed, the controller 208 generates, at step 320, the power control signal of the logic low state to cut off the AC power being supplied to the DC power generator 206.

If the power saving mode is not set (i.e., a normal mode is set) at step 306, the controller 208 checks whether or not the power switch SW is turned on, at step 322. If the power switch SW is not turned on, the controller 208 checks, at a step 324, whether the VCR is at a power-off state meaning that the reserved recording is completed. If the power switch SW is turned on or the VCR is at the power-off state, the controller 208 is switched over into the power saving mode of operation, at a step 326.

The steps 302 through 326 are repeated to provide the AC-DC converter 206 with the AC power according to the normal and power saving modes of operations.

In summary, the controller 208 controls the power switching circuit 204 to provide the AC-DC converter 206 with the AC power continuously during the normal mode, and to provide the AC-DC converter 206 with the AC power intermittently at predetermined intervals during the power saving mode.

As described heretofore, the power supply control circuit according to the present invention generates the DC power output intermittently at predetermined intervals during the power saving mode of operation, thereby saving power.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention. For example, the inventive concepts may be applied to a printer, computer, and the like as well as the VCR.

What is claimed is:

1. A power supply control circuit comprising:

an AC power circuit which receives an AC power input and which outputs AC power for a predetermined time;

an AC-DC converter, connected to said AC power circuit, which converts said AC power, supplied from said AC power circuit, into DC power; and a controller, which receives a power-on/off control signal generated from a power switch, for generating a first power control signal, having a first logic state, in response to said power-on signal, and for generating a second power control signal, alternating between said first logic state and a second logic state, in response to said power-off signal, said AC power circuit outputting said AC power for said predetermined period of time in response to one of said first power control signal and said second power control signal.

2. The power supply control circuit according to claim 1, wherein said second power control signal alternates between said first logic state and said second logic state at predetermined intervals.

3. A power supply control circuit comprising:

a driving circuit operating in one of a normal mode of operation and a power saving mode of operation;

a controller for controlling said driving circuit to operate in said one of said normal mode of operation and said power saving mode of operation in response to a power-on/off signal, said controller generating a first power control signal having a first logic state during said normal mode, and generating a second power control signal alternating between said first logic state and a second logic state during said power saving mode; and power supply means for converting received AC power into DC power, and for supplying said DC power to said driving circuit in response to said first power control signal having said first logic state, and for cutting off said AC power in response to said second logic state of said second power control signal.

4. The power supply control circuit according to claim 3, wherein said power supply means comprises:

an input terminal for receiving said AC power;

power control means, connected to said input terminal, for supplying said AC power to said driving circuit in response to said first logic state of said first and second power control signals, and for cutting off said AC power supplied to said driving circuit in response to said second logic state of said second power control signal; and an AC-DC converter for converting said AC power from said power control means into DC power.

5. The power supply control circuit according to claim 3, wherein a time ratio of said first logic state to said second logic state is 1:59.

6. A method for controlling power supply provided to a driving circuit operating in a normal mode or a power saving mode of operation, comprising the steps of:

providing said driving circuit with power continuously during said normal mode of operation; and providing said driving circuit with power intermittently, at predetermined intervals, during said power saving mode of operation.

7. The method according to claim 6, wherein said step of providing said power intermittently comprises the step of controlling a power-on state to a power-off state ratio to be 1:59.

8. A method for controlling supply of power from a power supply control circuit to a driving circuit in a normal mode or a power saving mode of operation, comprising the steps of:

receiving AC power from an AC power circuit;

converting said AC power into DC power;

generating a first power control signal, having a first logic state, in response to a power-on signal from a power switch; and generating a second power control signal, alternating between said first logic state and a second logic state, in response to a power-off signal from said power switch.

9. The method according to claim 8, wherein said step of generating said second power control signal comprises the step of alternating a level of said second power control signal, at predetermined intervals, between said first logic state and said second logic state.

10. A method for controlling supply of power, from a power supply control circuit, to a driving circuit, comprising the steps of:

controlling operation of said driving circuit in one of a normal mode of operation and a power save mode of operation;

generating a first power control signal having a first logic state;

generating a second power control signal alternating between said first logic state and a second logic state;

controlling said driving circuit to operate in said normal mode in response to said first power control signal; and controlling said driving circuit to operate in said power save mode in response to said second power control signal.

11. The method according to claim 10, further comprising the steps of:

receiving an AC power from an AC power circuit;

converting said AC power to DC power; and outputting said DC power to said driving circuit in response to one of said first power control signal and said second power control signal.

12. The method according to claim 11, further comprising the steps of:

outputting said first power control signal, in said normal mode of operation, in response to a power-on signal from a power switch; and outputting said second power control signal, in said power save mode of operation, in response to a power-off signal from said power switch.

13. The method according to claim 12, wherein said step of generating said second power control signal comprises the step of:

alternating said level of said second power control signal between said first logic state and said second logic state at predetermined intervals, wherein said DC power is supplied to said driving circuit when said level of said power control signal is at said second logic state.

* * * * *